United States Patent [19]

Norris

[11] 4,239,365
[45] Dec. 16, 1980

[54] ACCESSORY FOR ADAPTING CAMERAS TO SMALL FORMAT PHOTOGRAPHIC FILM UNITS

[75] Inventor: Philip R. Norris, North Reading, Mass.

[73] Assignee: Polaroid Corporation, Cambridge, Mass.

[21] Appl. No.: 36,813

[22] Filed: May 7, 1979

[51] Int. Cl.³ .................. G03B 17/00; G03B 17/26; G03B 17/28
[52] U.S. Cl. ........................... 354/295; 354/85; 354/275; 354/288
[58] Field of Search .................. 354/275, 276, 83–86, 354/60 E, 60 L, 289, 21, 288, 295; 206/455; 96/200, 201

[56] References Cited

U.S. PATENT DOCUMENTS

| | | | |
|---|---|---|---|
| 908,531 | 1/1909 | Wright | 354/179 |
| 4,016,582 | 4/1977 | Warcham | 354/275 |
| 4,075,643 | 2/1978 | Lane | 354/276 X |

Primary Examiner—J. V. Truhe
Assistant Examiner—Shelley Wade

Attorney, Agent, or Firm—David R. Thornton

[57] ABSTRACT

An accessory for use in an instant camera designed for standard film packs and by which the same camera may be used to expose and process film units of reduced image format size prepackaged in corresepondingly sized film packs. The accessory takes the form of a U-shaped housing having exterior planar dimensions to complement the interior planar dimensions of a well in the camera designed to receive a standard film pack. This configuration of the housing establishes a front opening chamber to receive and position the modified film pack of reduced size. The accessory is further configured to retain and position a sheet-like battery in position for supplying electric power to the camera during exposure and processing of a plurality of the reduced sized film packs. Indicating means are also contained in the accessory for informing the camera operator as to the charge level of the storage battery. The indicating means may be either an electrical battery testing circuit or a mechanical counter and indicator by which the user is informed of the need to change the battery after a predetermined number of film packs have been exposed and processed in the camera.

13 Claims, 6 Drawing Figures

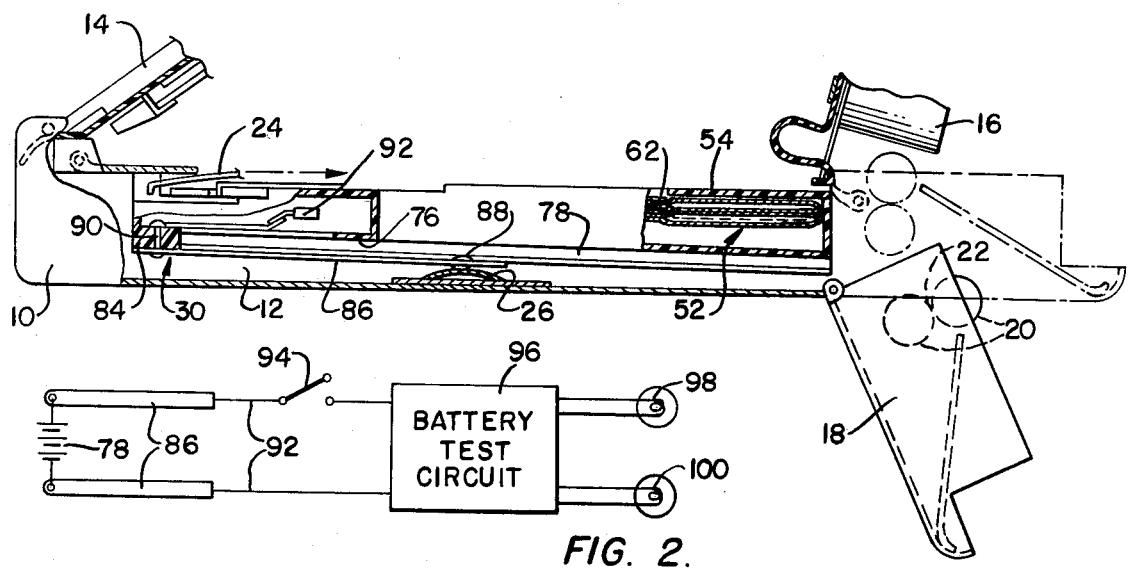
FIG. 1.
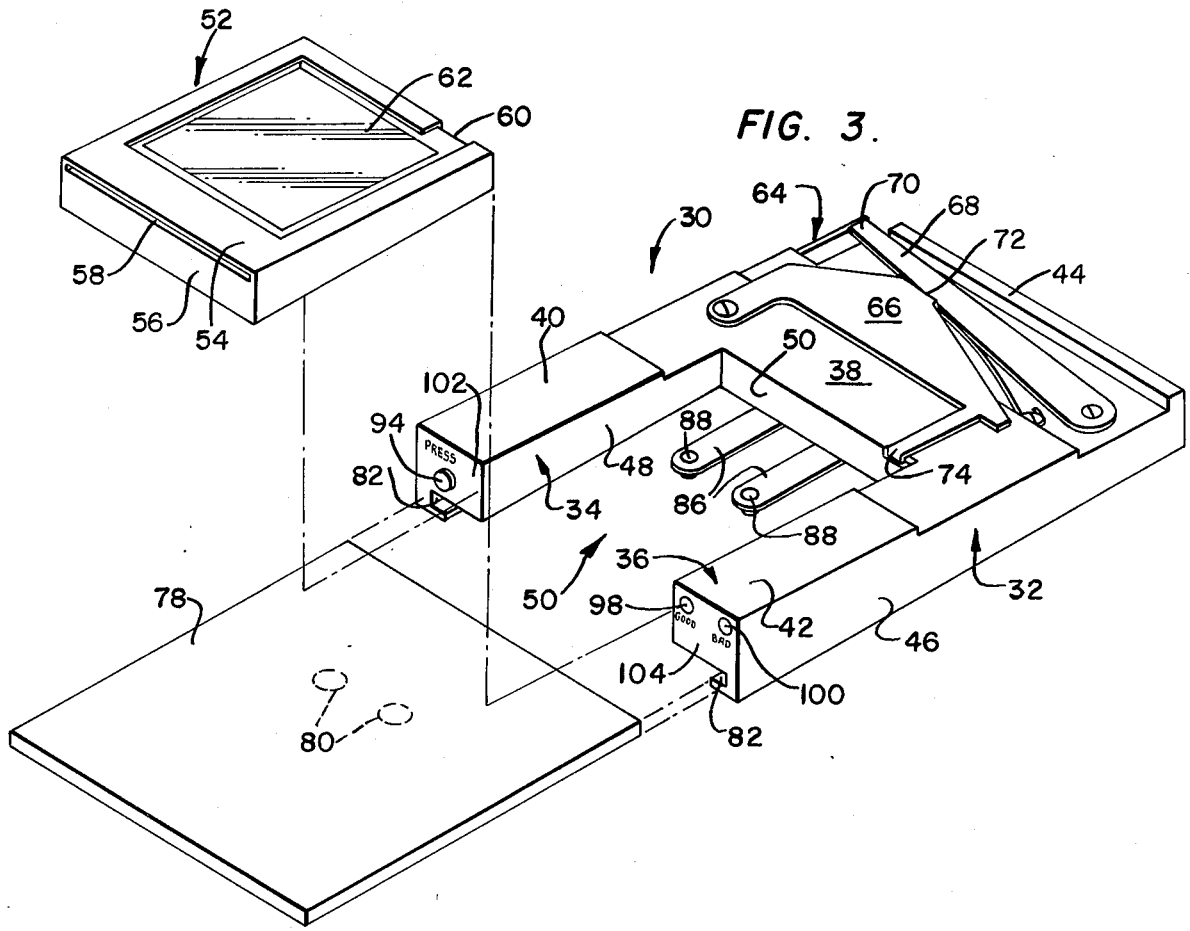
FIG. 2.
FIG. 3.

U.S. Patent  Dec. 16, 1980  Sheet 2 of 2  4,239,365
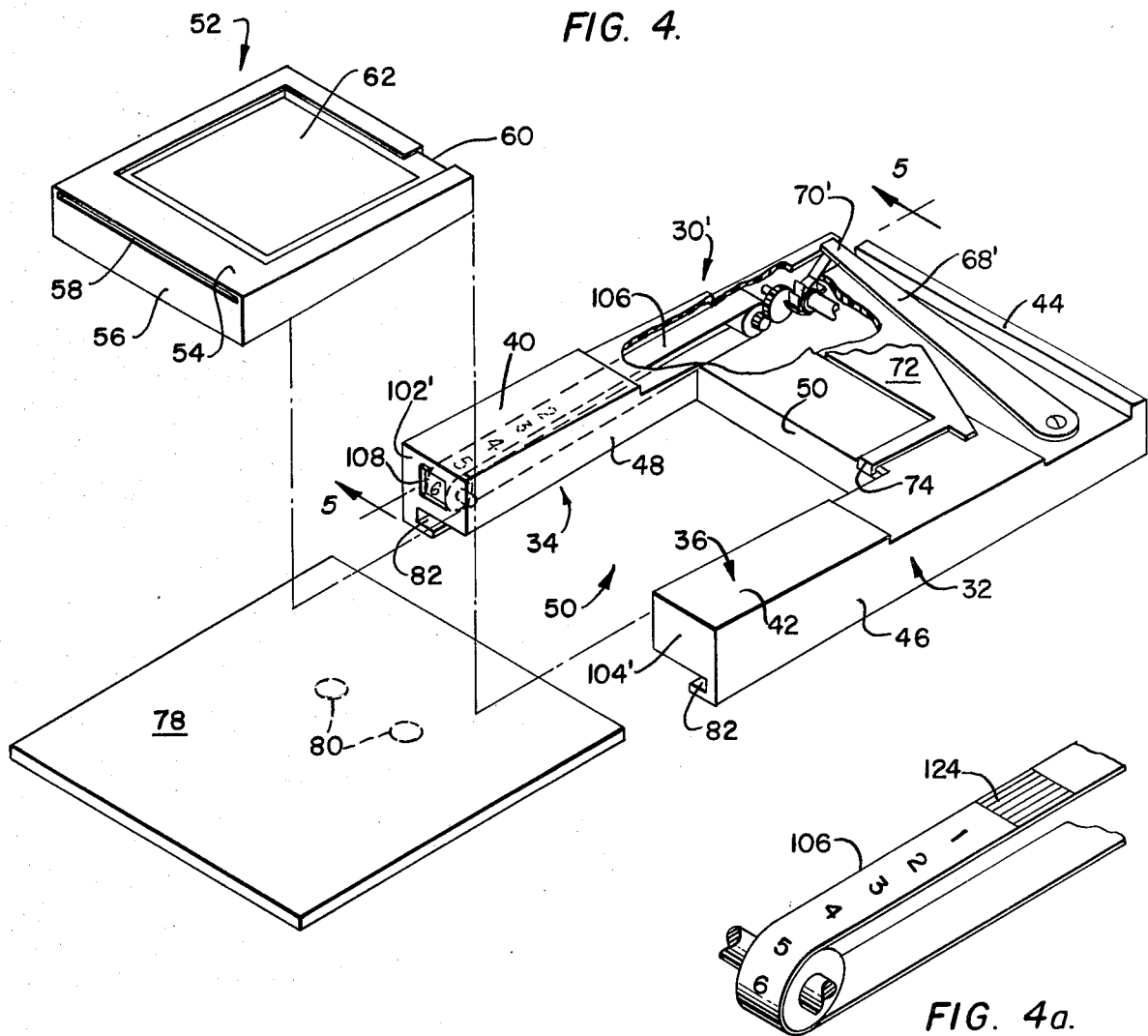
FIG. 4.
FIG. 4a.
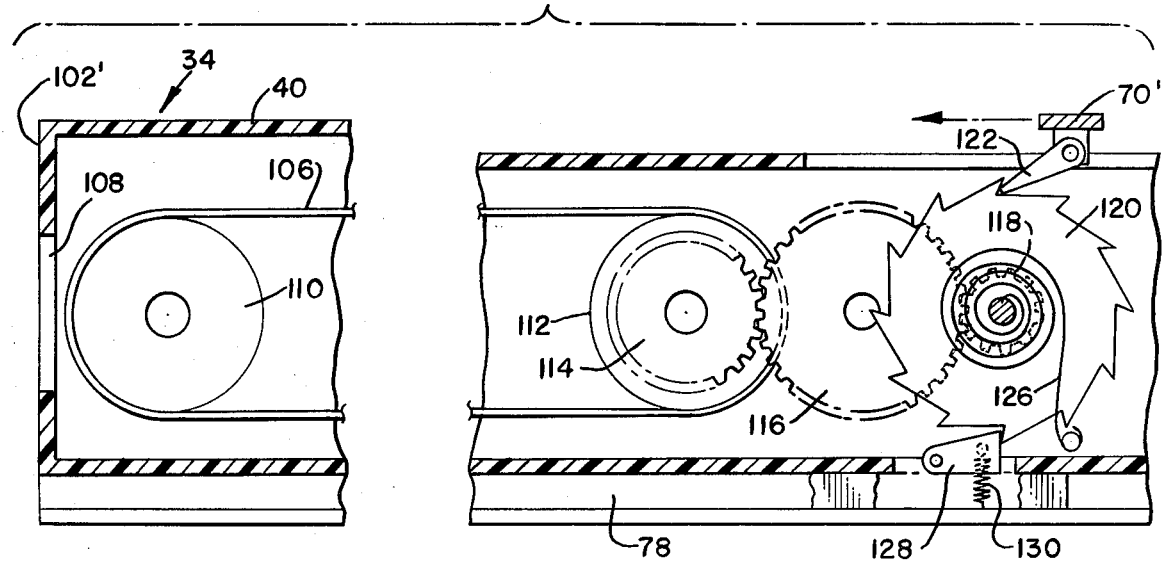
FIG. 5.

ACCESSORY FOR ADAPTING CAMERAS TO SMALL FORMAT PHOTOGRAPHIC FILM UNITS

BACKGROUND OF THE INVENTION

This invention relates to photographic systems and more particularly, it concerns improved apparatus for accommodating modified format sizes of photographic sheet film in existing camera systems.

In the camera system marketed by Polaroid Corporation under the trademarks "POLAROID SX-70 LAND CAMERA" and "POLAROID SX-70 LAND FILM," camera structure and operation are integrated with a container or pack film in the sense that electric power for camera operation is supplied by a battery packaged with each film pack, a main power switch is closed upon full insertion of the film pack to connect the battery with camera carried electric circuitry, and the film container defines the location and to some extent the format area of an image to be formed on the uppermost of successive film units in the container. Each film unit in the system carries a supply of processing fluid in an amount calibrated to cover the image format area after exposure and passage of the sheet assembly between a motor driving processing roller pair supported in the camera. In particular, the processing fluid is spread across the interface between a pair of plastic sheets in each unit, at least one of which plastic sheets is transparent for exposure of a light sensitive layer carried between the sheets and so that the resulting positive photographic image may be viewed.

In the operation of the syste, the uppermost film unit in the container is exposed and then engaged at its rear edge (the top edge of the resulting photograph) by a linearly driven pack and advanced through a slot in the front wall of the container for a distance calibrated to place the leading edge of the exposed film sheet (the bottom edge of the photograph) within the nip of the processing roller pair. The roller then feed the exposed film unit forwardly to first rupture the processing fluid pod, spread the processing fluid across the interface between the plastic sheets and finally discharge the exposed and processed unit from the camera.

The battery supplied with each pack of the presently available "POLAROID SX-70 LAND FILM" is of a rectangular sheet-like configuration with dimensions approximating those of the individual film units. The terminals of the battery are presented in a lower face thereof to be accessible through appropriate openings in the bottom wall of the film pack container. The power storage capacity of the presently used battery is, moreover, much greater than that necessary to operate the camera for the exposure and processing of the number of film units contained in the film pack with which the battery is supplied. The excess of power stored in the battery is by design and to assure full power operation of the camera with each film pack as well as to provide the battery with a shelf life compatible with that of the film.

In a commonly owned and co-pending application Ser. No. 902,064, filed May 2, 1978 by John J. Driscoll et al, there is disclosed an accessory by which the existing "POLAROID SX-70 LAND CAMERA" is adapted to expose and process a small format (e.g., 35 or 45 mm format) film units prepacked in a modified container complementing the reduced size of the film units. The accessory disclosed is in the nature of a U-shaped housing having exterior planar dimensions complementing the interior planar dimensions of the standard film pack receiving well in the camera. The housing defines a forwardly opening recess of a size to receive and position the modified film pack and is otherwise equipped to retain the functional coaction of the standard film pack with the camera in terms of electric switch actuation and the like.

The disclosure of the aforementioned co-pending application further contemplates the incorporation of a sheet-like battery with each of the modified film packs cooperable with the disclosed accessory. In modestly reduced format sizes of film units such as a 45 mm format, the combination of film unit location and area represented thereby may permit the use of a modified battery positioned in the bottom of the reduced film pack container to be provided with planar terminals overlying the existing battery terminal contacts in the camera. Otherwise, the battery is accommodated by a peripheral flange-like extension of the modified film pack container about a lower edge thereof.

SUMMARY OF THE PRESENT INVENTION

In accordance with the present invention, an improved accessory is provided for existing instant cameras designed to expose self-processing film units of a standard format size and by which a separate electric storage battery may be used as a power supply for the camera to expose and process small format film units contained in a plurality of film packs modified only to accommodate the reduced format size of the film units. The accessory is again embodied in a housing having external planar dimensions to complement the existing interior dimensions of the film pack well of the camera and provided with pick relay means by which the relatively small format film unit may be initially translated by the existing camera mounted pick. In this instance, however, the battery, preferably a sheet-like battery of a size resembling a standard film unit, and reduced format film pack are separately received in chambers defined by the accessory housing. In addition, provision is made in the accessory to give the camera operator an indication of the charge status of the battery. This latter facility may be provided by a conventional battery testing circuit enclosed in the accessory housing or by a housing enclosed mechanical counter carrying indicia indicating the number of film packs processed by a battery as well as indicia indicating that the battery should be replaced. In both instances, the indicia easily viewed on loading or unloading a film pack.

Among the objects of the present invention are therefore: to provide an improved accessory by which existing camera may accommodate reduce format film units; the provision of such an accessory by which a single sheet-like battery unit may be used as a source of electrical power to operate the camera through a plurality of film packs; and the provision of such an accessory by which the charge status of an electrical storage battery may be determined.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 1 is a fragmentary side elevation in partial cross-section illustrating the accessory of the present invention mounted in the camera well of an existing instant camera;

FIG. 2 is a circuit diagram illustrating the electrical connection of components carried by the accessory with a conventional battery test circuit;

FIG. 3 is an exploded perspective view illustrating film pack and battery components in relation to the one embodiment of the present invention;

FIG. 4 is an exploded perspective view similar to FIG. 3 but illustrating an alternative embodiment of the invention;

FIG. 4a is an enlarged fragmentary perspective view of an indicating belt of the embodiment of FIG. 4; and FIG. 5 is an enlarged fragmentary cross-section on line 5—5 of FIG. 4.

DETAILED DESCRIPTION OF THE PREFERRED EMBODIMENTS

In FIG. 1 of the drawings, those portions of a foldable, single lens reflex camera available commercially under the trade designation "POLAROID SX-70 LAND CAMERA" which are necessary for a full appreciation of the present invention, are shown to include a body 10 defining a film pack well 12, a foldable cover member 14, a shutter housing 16 and a hinged door housing 18 pivotal from an open position depicted by solid lines for access to the well 12 to a closed position represented by the phantom line illustration in FIG. 1. The door housing carries a pair of processing rollers 20 defining a pressure nip 22 and which in practice are operatively associated with an electric motor and drive train (not shown). As is well known, the camera represented in FIG. 1 is loaded with a film pack by opening the door housing and moving the pack rearwardly into the well 12. Thereafter, the uppermost of a stack of film units contained in the pack may be exposed and after such exposure, processed and ejected from the camera by passage through the nip 22 of the pressure rollers 20. Initial movement of each film unit to the nip of the pressure rollers is effected by a pick 24 forming part of the existing camera and operable to engage and translate the uppermost film unit after exposure. Electric power for the camera is conventionally supplied by a sheet-like battery packaged in each film pack and having downwardly facing terminals to engage a pair of contacts 26 presented on the floor of the film pack well 12.

All of the camera components thus described are present in the existing camera systems with which the present invention is used. Moreover, these existing camera components are retained without modification as a feature incident to the improved accessory of the present invention.

One embodiment of the improved accessory of the present invention is generally designated by the reference numeral 30 in FIGS. 1 and 3 of the drawings. As shown, the accessory is constituted by a hollow, generally U-shaped housing 32 having a pair of forwardly projecting leg portions 34 and 36 subtended by a base 38. The exterior top planar dimension of the housing 32 is established by top surfaces 40 and 42 on the legs 34 and 36, respectively, and by at least a surface 44 at the rear of the base portion 38. The surfaces 40, 42 and 44 are coplanar and represent a planar dimension identical to the corresponding dimension of a conventional film pack adapted to be received into the film pack well 12 of the existing camera. The existing side surfaces 46 as well as the front, rear and bottom exterior surfaces are correspondingly dimensioned.

The leg portions 34 and 36 include mutually facing, spaced inner wall surfaces 48 joining at right angles with a forwardly facing wall surface 50 on the front of the base portion 38 to establish a forwardly opening recess or chamber 50. The recess 50, as thus defined, is of a size to complement the exterior dimensions of a small format film pack 52. The film pack 52 is similar in most respects to a conventional film pack sold under the trade designation "POLAROID SX-70 LAND FILM" and as such includes a container having a marginal upper wall 54, a front wall 56 having a slot 58 and a notch or cut-out 60 adjacent a rear corner thereof. The container houses a stack of reduced format film units 62 in a manner such that the image format area of the uppermost film unit is presented in the opening defined by the marginal upper wall 54. Although the described structure of the film pack 52 is adequate for a full understanding of the present invention, further information regarding dimensional modifications of the reduced format film pack 52 may be had by reference to the afore-mentioned co-pending application Ser. No. 902,064, filed May 2, 1978.

Also as described in the afore-mentioned co-pending application, the accessory 30 is provided with a pick relay and amplifier 64 by which movement of the camera carried pick 24 is transmitted to the uppermost film unit 62 in the modified film pack 52 to effect initial translation of such unit through the slot 58 to the nip 22 of the pressure roller pair 20 in the existing camera. As shown in FIG. 3, the pick relay and amplifier includes a pair of pivotal arms 66 and 68, the arm 68 having an end 70 positioned for engagement by the camera pick 24. The other of the two arms 66 is provided with an intermediate fulcrum 72 positioned to be engaged by the arm 68 and at its free or pivotal end with a relay pick 74 positioned to be aligned with the notch 60 in the modified film pack 52. As a result of this organization, movement of the arm 68 by the camera pick 24 will result in movement of the relay pick 74 through a distance increased by the lever system shown. The reason for such pick movement amplification is fully described in the afore-mentioned co-pending application and need not be described here except to note that it is to accommodate a reduced width of the lower margin of each of the reduced format film units 62 as a result of a correspondingly reduced size of a processing fluid pod carried at this portion of each film unit.

Also as shown in FIGS. 1 and 3, the housing 32 of the accessory 30 is shaped to define a marginal battery recess or shelf 76 by which a sheet-like battery 78 may be retained by the accessory 30 independently of the modified film pack 52. The battery 78 is identical in all respects to the battery presently used with "POLAROID SX-70 LAND FILM". As such, the battery both approximates the peripheral dimensions of the existing film unit and is equipped with a pair of downwardly presented terminals 80 (FIG. 3). The peripheral battery shelf 76 is defined along its edges by inwardly and upwardly facing ledges 82 provided at the bottom of each of the leg portions 34 and 36.

Projecting forwardly from a rear bottom wall portion 84 of the housing 32 are a pair of conductive leaves 86, each having oppositely projecting terminal buttons 88 at its projecting or face end. The terminal buttons 88 are thus positioned to overlie and make contact with the battery contacts 26 in the existing camera. The buttons 88 will also engage and make electrical contact with the battery terminals 80 when the battery 78 is operatively positioned in the accessory 30. Thus, the connection of the battery terminals 80 with the camera carried contacts 26 will be through the terminal buttons 88 and be operative in the same manner as if the battery terminals made direct contact with the contacts 26. As shown in FIG. 1, the conductive leaves 86 are cantilevered from the lower rear wall portion 84 by conductive rivets 90, or equivalent, which are connected in the interior of the hollow housing 32 with leads 92.

As shown in the schematic diagram of FIG. 2 of the drawings, the leaves 86 are in a circuit through a switch 94 with a battery test circuit 96 having a pair of indicator lamps or light emitting diodes 98 and 100. The battery test circuit is intended to be any one of several well known battery test circuits which, when the switch 94 is closed, will energize one of the lights 98 or 100 if the battery is charged to a predetermined satisfactory level whereas the other of the two lights will be energized or lit when the battery charge is lower than this level.

As shown in FIG. 3, the switch 94 as well as the lights 98 and 100 are presented physically on the front faces 102 and 104 of the respective housing leg portions 34 and 36. Appropriate indicia may be presented also on the respective faces 104 and 106 to facilitate use of the battery test circuit.

In the use of the accessory 30, the camera door housing 18 is opened and the accessory 30 inserted as a unit into the film pack well 12 of the existing camera. When so inserted, the front faces 102 and 104 will be visibly accessible with the door housing 18 in its open position. With the accessory in place, a battery 78 may be inserted through the open door housing rearwardly onto the peripheral battery 76 of the accessory housing 32 so that the battery terminals 80 overlie the contact buttons 88 on the conductive leaves 86. Thereafter, a series of the modified film packs may be inserted in the camera operated in conventional fashion to successively expose, process and eject the film units 62 contained in each film pack. The number of modified film units which may be handled in the camera for a battery 78 will be determined by the indication provided by the lamps 98, 100 by merely depressing the switch 94.

It is to be noted that although the accessory 30 is particularly well suited for use of the sheet-like battery currently supplied with each pack of "POLAROID SX-70 LAND FILM", the provision of leaves 86 and location of the terminal buttons 88 thereon enables batteries of more conventional configuration to be used in lieu of the sheet-like battery 78. For example, one or both of the housing legs 34 and 36 may be modified to include internal cylindrical battery retaining chambers accessible, for example, through the back or bottom of the accessory 30 and connected by appropriate leads to both the battery test circuit and to the conductive leaves 86. Because the bottom of the modified film pack 52 is non-conductive, the terminal buttons 88 would engage the contacts 26 in the film pack well 12 to provide a power supply circuit from the accessory retained batteries to the camera carried electrical components.

In FIGS. 4 and 5 of the drawings, a modified embodiment of the accessory of this invention is shown and in which parts identical to those described above with respect to the embodiment of FIGS. 1–3 are identified by the same reference numerals. Parts which serve the same function as corresponding parts in the previous embodiment but which are modified structurally are designated by the same reference numerals primed.

The accessory 30' in FIGS. 4 and 5 is, therefore similar in all functional respects to the previously described embodiment except that in this instance, the electrical battery test circuit of the previous embodiment is substituted by a mechanical counter and battery replacement indicator. In particular, an indicator tape or belt 106 is housed within the leg 34 of the housing 32 and provided with indicia visible through a window 108 provided in the front wall 102' of the leg 34. The belt 106 is trained about a pair of pulleys 110 and 112 appropriately journalled in the housing 32. The rearwardly disposed pulley 112 is adapted to be rotatably driven by a gear train including a pinion gear 114 keyed with the pulley 112, a reduction gear 116 and a drive gear 118 coupled for rotation with a ratchet wheel 120. The lever arm 68' is modified at its free end 70' to include a drive pawl 122 positioned for incremental driving engagement of the ratchet wheel 120.

As a result of the organization illustrated in FIGS. 4 and 5, each time the camera is operated to discharge an exposed film unit 62, the ratchet 120 will be rotated through an angular increment of movement. This movement, in turn, is transmitted through the reduction gearing illustrated to advance the indicator belt 106 through an increment of movement. It is preferred that the reduction gearing be correllated with movement of the pawl 122 and the ratchet wheel 20 such that the indicator belt is advanced through one numbered increment each time all the film units in the modified film pack 52 are ejected from the camera. In the illustrated embodiment, the numbered indicia on the indicator belt 106 is selected to give the camera operator an indication of the number of film packs which remain to be exposed and processed without removal of the battery 78. When the battery has been used for operation of the camera through a predetermined number of film packs 52, a battery change indicator 124 on the belt 106 will appear at the window 108.

It will be noted in FIG. 5 that the ratchet 120 is biased under a return force by a clock spring 126 and further, that a latching pawl 128 is positioned to prevent winding of the ratchet under the force of the spring 26 so long as a battery 78 retains the latching pawl 128 upwardly against the bias of a return spring 130. As a result of this organization, when a spent battery 78 is removed from the accessory 30', the pawl 128 will be displaced away from the ratchet wheel 120, allowing the spring 126 to return it and the indicator belt to its initial position. Then, when a new battery is inserted, the latching pawl 128 will again engage the ratchet wheel to retain it in the position to which it has been moved by repetitive movement of the actuating pawl 122 on the lever arm 68'.

Thus, it will be seen that as a result of the present invention, an improved accessory is provided by which an existing camera may be adapted to handle small format film, and also by which multiple packs of the reduced small format film may be exposed and processed using a common battery. Since modifications and/or changes may be made in either of the disclosed embodiments without departure from concepts underlying the present invention, it is expressly intended that the foregoing description is illustrative of preferred embodiments only, not limiting, and that the true spirit and scope of the present invention be determined by reference to the appended claims.

What is claimed is:

1. An accessory for adapting small format film packs to a camera, the camera having a film pack well with a front access opening, a floor and interior dimensions designed to complement exterior dimensions of a standard film pack containing relatively large format film units, the camera also having battery contacts presented on the floor of the film pack well in a position to be engaged by a sheet-like battery having terminals presented through the bottom of the standard film pack, said accessory comprising:

a housing having exterior planar dimensions complementing the interior dimensions of the film pack well of the camera and defining in part, a front-opening chamber to receive a small format film pack, said housing including a front wall to be positioned at the access opening of the film pack well and also defining means to receive and retain an electric storage battery, and means in said housing presented visibly at said front wall to indicate the charge status of a battery retained therein.

2. The apparatus recited in claim 1, wherein said indicating means comprises an electric battery test circuit having actuating switch and indicating light components presented in said front wall.

3. The apparatus recited in claim 1, wherein said indicating means comprises means for counting the number of film packs received in said front opening chamber for a given battery and for indicating such number at said front wall.

4. The apparatus recited in claim 1 wherein said means to receive and retain an electric storage battery comprises a peripheral shelf underlying said chamber and dimensioned to retain a sheet-like battery and position same so that terminals in the lower face thereof are in electrical engagement with said battery contacts.

5. An accessory for adapting small format film packs to a camera, the camera having a film pack well with a front access opening, a floor and interior dimensions designed to complement exterior dimensions of a standard film pack containing relatively large format film units, the camera also having battery contacts presented on the floor of the film pack well in a position to be engaged by a sheet-like battery having terminals presented through the bottom of the standard film pack and a pick movable in the well to engage and initially translate the uppermost of a stack of standard film units in the standard film pack, said accessory comprising:

a generally U-shaped housing to provide a pair of laterally spaced leg portions projecting forwardly from a base portion and having exterior planar dimensions complementing the interior dimensions of the film pack well of the camera, the mutually facing surfaces of said leg portions together with the front surface of said base portion defining in part, a front opening chamber to receive a small format film pack, said housing also having a battery shelf near the bottom thereof to receive and retain a sheet-like electric storage battery having a pair of terminals in a lower face thereof, the storage battery being positioned under said front opening chamber and so that the battery terminals are in electrical engagement with the camera battery contacts;

pick relay means supported by said housing and having an accessory pick to engage the uppermost of a stack of small format film units in said small format film pack upon movement of the camera pick; and means in said housing to indicate the charge status of a battery retained therein, said means to indicate the charge status of a battery comprising an electrical battery testing circuit, and said housing including a pair of electrically conductive members for connecting said battery test circuit to the terminals of a battery retained by said housing.

6. The apparatus recited in claim 5 wherein said electrically conductive members comprise a pair of leaves cantilevered forwardly from the bottom of said base portion, each of said leaves having oppositely projecting terminal buttons to lie between said battery terminals and the camera carried battery contacts.

7. An accessory for adapting small format film packs to a camera, the camera having a film pack well with a front access opening, a floor and interior dimensions designed to complement exterior dimensions of a standard film pack containing relatively large format film units, the camera also having battery contacts presented on the floor of the film pack well in a position to be engaged by a sheet-like battery having terminals presented through the bottom of the standard film pack and a pick movable in the well to engage and initially translate the uppermost of a stack of standard film units in the standard film pack, said accessory comprising:

a generally U-shaped housing to provide a pair of laterally spaced leg portions projecting forwardly from a base portion and having exterior planar dimensions complementing the interior dimensions of the film pack well of the camera, the mutually facing surfaces of said leg portions together with the front surface of said base portion defining in part, a front opening chamber to receive a small format film pack, said housing also having a battery shelf near the bottom thereof to receive and retain a sheet-like electric storage battery having a pair of terminals in a lower face thereof, the storage battery being positioned under said front opening chamber and so that the battery terminals are in electrical engagement with the camera battery contacts;

pick relay means supported by said housing and having an accessory pick to engage the uppermost of a stack of small format film units in said small format film pack upon movement of the camera pick; and means in said housing to indicate the charge status of a battery retained therein, said means to indicate comprising means for counting the number of film packs received in said front opening chamber for a given battery and for indicating such number at said front wall.

8. The apparatus recited in claim 7 wherein said indicator means comprises indicia carrying means, ratchet means for advancing said indicia carrying means and a drive pawl for incrementally advancing said ratchet means, said drive pawl being carried by said pick relay means and therefore operable to advance said ratchet means each time the camera pick is operated.

9. The apparatus recited in claim 8 including gear reduction means for coupling said ratchet means with said indicia carrying means and operative to advance said indicia carrying means through one indicia increment for a plurality of camera pick movements equal in number to the number of film units contained in a small format film pack.

10. The apparatus recited in claim 8 wherein said indicator means further comprises a return spring and a latching pawl to retain said ratchet means against movement by said return spring.

11. The apparatus recited in claim 10 wherein said latching pawl is retained in engagement with said ratchet means by said sheet-like battery and movable out of engagement with said ratchet means upon removal of said sheet-like battery from the accessory.

12. An accessory for use in a camera normally intended to operate with a standard pack of self-processing film units, the standard pack having a given outside surface conformation and means for defining an exposure window of given size through which film units within the standard film pack may be exposed, the camera including means for defining a well to receive and position the standard film pack for exposure operations, battery contacts presented adjacent the floor within the well, a pair of opposed processing members defining therebetween a pressure nip through which each of the self-processing film units contained within the standard film pack is passed after its exposure to effect the processing thereof, the leading edge of each of the self-processing film units contained within said standard pack being spaced a given distance from the pressure nip of the processing members prior to its advancement into the nip, and pick means for engaging each film unit of the standard pack after its exposure and effecting the advancement of its leading edge into the pressure nip, said accessory comprising:
  a housing having an outside surface conformation structured to snugly fit within the camera's well, said housing defining a recess to removably receive therein a modified film pack containing a plurality of self-processing film units, each being substantially smaller in size than the film units of the standard film pack and presenting a substantially smaller photosensitive area than that of the film units of the standard film pack, disposed in a stacked array to be sequentially positioned in an exposure position within the camera when the modified film pack is positioned in said accessory and the accessory is positioned within the camera's well;
  relay pick means carried by said housing for transmitting movement of the camera's pick means to each of the modified film pack's film units after its exposure in a manner causing the leading edge of the exposed film unit of the modified film pack to be advanced into the pressure nip of the camera's processing members;
  means for replaceably receiving a substantially flat battery in electrical contact with the camera's battery contacts when said accessory is operatively positioned within the camera's well; and
  means in said housing to indicate the charge status of a battery received therein, said means to indicate comprising an electric battery test circuit.

13. An accessory for use in a camera normally intended to operate with a standard pack of self-processing film units, the standard pack having a given outside surface conformation and means for defining an exposure window of given size through which film units within the standard film pack may be exposed, the camera including means for defining a well to receive and position the standard film pack for exposure operations, battery contacts presented adjacent the floor within the well, a pair of opposed processing members defining therebetween a pressure nip through which each of the self-processing film units contained within the standard film pack is passed after its exposure to effect the processing thereof, the leading edge of each of the self-processing film units contained within said standard pack being spaced a given distance from the pressure nip of the processing members prior to its advancement into the nip, and pick means for engaging each film unit of the standard pack after its exposure and effecting the advancement of its leading edge into the pressure nip, said accessory comprising:
  a housing having an outside surface conformation structured to snugly fit within the camera's well, said housing defining a recess to removably receive therein a modified film pack containing a plurality of self-processing film units, each being substantially smaller in size than the film units of the standard film pack and presenting a substantially smaller photosensitive area than that of the film units of the standard film pack, disposed in a stacked array to be sequentially positioned in an exposure position within the camera when the modified film pack is positioned in said accessory and the accessory is positioned within the camera's well;
  relay pick means carried by said housing for transmitting movement of the camera's pick means to each of the modified film pack's film units after its exposure in a manner causing the leading edge of the exposed film unit of the modified film pack to be advanced into the pressure nip of the camera's processing members;
  means for replaceably receiving a substantially flat battery in electrical contact with the camera's battery contacts when said accessory is operatively positioned within the camera's well; and
  means in said housing to indicate the charge status of a battery received therein, said means to indicate comprising means for counting the number of film packs positioned in said film pack receiving means prior to replacing a particular battery positioned in said battery receiving means and for providing an indication of said number of film packs.

* * * * *